(12) United States Patent
Xiao et al.

(10) Patent No.: US 8,030,895 B2
(45) Date of Patent: Oct. 4, 2011

(54) CELL BALANCING SYSTEMS WITH MULTIPLE CONTROLLERS

(76) Inventors: Fenghua Xiao, Beijing (CN); Enbing Xu, Shanghai (CN); Jiulian Dai, Shanghai (CN)

( * ) Notice: Subject to any disclaimer, the term of this patent is extended or adjusted under 35 U.S.C. 154(b) by 623 days.

(21) Appl. No.: 12/005,559

(22) Filed: Dec. 27, 2007

(65) Prior Publication Data

US 2009/0167243 A1    Jul. 2, 2009

(51) Int. Cl.
*H02J 7/00*   (2006.01)
(52) U.S. Cl. .................. 320/119; 320/118; 320/122
(58) Field of Classification Search .............. 320/119, 320/122
See application file for complete search history.

(56) References Cited

U.S. PATENT DOCUMENTS

| | | | |
|---|---|---|---|
| 6,043,628 A * | 3/2000 | Perelle et al. | 320/119 |
| 6,377,024 B1 * | 4/2002 | Choy | 320/118 |
| 6,841,971 B1 * | 1/2005 | Spee et al. | 320/119 |
| 7,511,457 B2 * | 3/2009 | Emori et al. | 320/118 |
| 2004/0135546 A1 * | 7/2004 | Chertok et al. | 320/118 |
| 2005/0077875 A1 | 4/2005 | Bohley | |
| 2006/0255769 A1 * | 11/2006 | Liu et al. | 320/134 |
| 2008/0090133 A1 * | 4/2008 | Lim et al. | 429/50 |

FOREIGN PATENT DOCUMENTS

JP   2007300701   11/2007

OTHER PUBLICATIONS

Yano Junya, Application No. 2006-124219, Apr. 27, 2006, "Power Supply Device for Vehicle" Patent Abstract of Japan, Publication No. 2007-300701, Nov. 15, 2007.

* cited by examiner

*Primary Examiner* — M'Baye Diao

(57) ABSTRACT

In one embodiment, a cell balancing system includes a first controller for controlling cell balancing of a first set of cells coupled in series, and a second controller for controlling cell balancing of a second set of cells coupled in series. There is at least one common cell in the first set of cells and the second set of cells.

25 Claims, 4 Drawing Sheets

CELL BALANCING SYSTEMS WITH MULTIPLE CONTROLLERS

TECHNICAL FIELD

This invention relates to cell balancing systems and more particularly to cell balancing systems with multiple controllers.

BACKGROUND ART

A conventional cell balancing system for balancing multiple sets of cells has multiple modules for balancing the cells, and an extra single-chip microcomputer for controlling all the modules. The single-chip microcomputer reads information for all the cell voltages from the modules and controls the modules for balancing the cells. Such a cell balancing system is costly. In addition, such a cell balancing system needs an abundance of code and complicated process operation.

SUMMARY

In one embodiment, a cell balancing system includes a first controller for controlling cell balancing of a first set of cells coupled in series, and a second controller for controlling cell balancing of a second set of cells coupled in series. There is at least one common cell in the first set of cells and the second set of cells.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In one embodiment, the present invention provides a cell balancing system for balancing a group of cells, e.g., a first plurality of cells coupled in series and a second plurality of cells coupled in series, by multiple controllers. A first controller can be used for controlling cell balancing of the first plurality of cells, and a second controller can be used for controlling cell balancing of the second plurality of cells. There is at least one common cell in the first plurality of cells and the second plurality of cells, such that the common cell can be used as a reference cell for balancing the first plurality of cells and the second plurality of cells. Advantageously, each of the first plurality of cells can be balanced with each of the second plurality of cells.

Figure 1A:
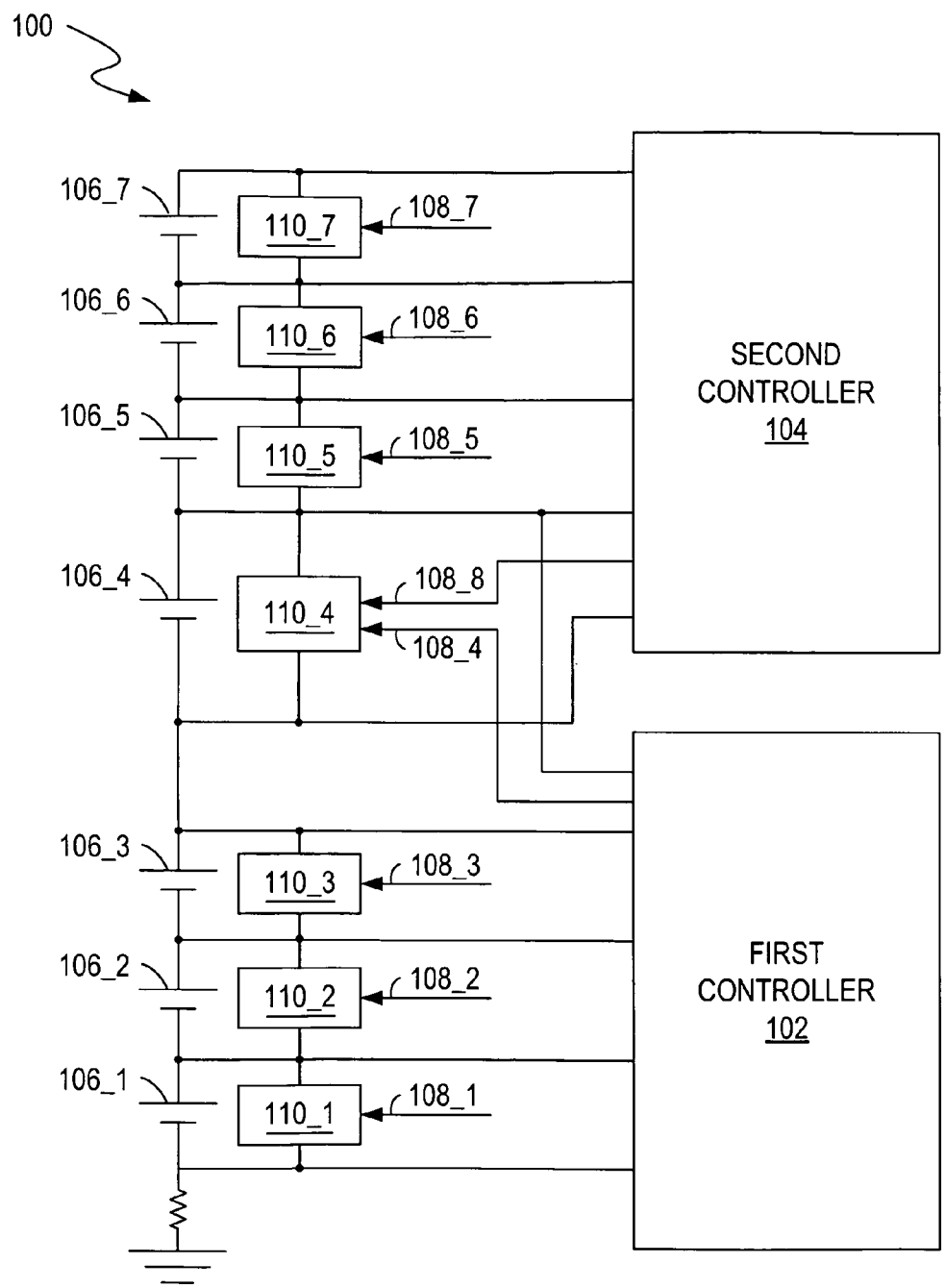
FIG. 1A shows a block diagram of a cell balancing system with multiple controllers, in accordance with one embodiment of the present invention.

FIG. 1A shows a block diagram of a cell balancing system 100 with multiple controllers, in accordance with one embodiment of the present invention. The cell balancing system 100 includes multiple controllers, e.g., a first controller 102 and a second controller 104. The first controller 102 can be used for controlling cell balancing of a first plurality of cells coupled in series. In the example of FIG. 1A, the first plurality of cells include four cells 106_1-106_4. The second controller 104 can be used for controlling cell balancing of a second plurality of cells coupled in series. In the example of FIG. 1A, the second plurality of cells include four cells 106_4-106_7. However, any number of cells can be included in the first plurality of cells and the second plurality of cells. There is at least one common cell 106_4 in the first plurality of cells 106_1-106_4 and the second plurality of cells 106_4-106_7.

As shown in FIG. 1A, the first controller 102 can monitor a cell voltage for each cell of the first plurality of cells 106_1-106_4, and also can generate one or more control signals 108_1-108_4 for controlling cell balancing of the first plurality of cells 106_1-106_4. Similarly, the second controller 104 can monitor a cell voltage for each cell of the second plurality of cells 106_4-106_7, and also can generate one or more control signals 108_5-108_8 for controlling cell balancing of the second plurality of cells 106_4-106_7.

The first controller 102 can be used to control charging (e.g., control charging current/charging voltage) of the first plurality of cells 106_1-106_4 by a power source (e.g., an adapter; not shown in FIG. 1A for purposes of clarity and brevity), and the second controller 104 can be used to control charging of the second plurality of cells 106_4-106_7 by the same power source. In addition, the first controller 102 can also be used to control discharging (e.g., controlling discharging current/discharging voltage) of the first plurality of cells 106_1-106_4 to a load (e.g., a computer system; not shown in FIG. 1A for purposes of clarity and brevity), and the second controller 104 can also be used to control discharging of the second plurality of cells 106_4-106_7 to the same load.

In one embodiment, the cell balancing system 100 further includes a first plurality of bypass paths 110_1-110_4 respectively coupled to the first plurality of cells 106_1-106_4 in parallel, and a second plurality of bypass paths 110_4-110_7 respectively coupled to the second plurality of cells 106_4-106_7 in parallel. Each of the first plurality of bypass paths 110_1-110_4 is controlled by the first controller 102 and is operable for enabling a bypass current of a corresponding cell of the first plurality of cells 106_1-106_4. Each of the second plurality of bypass paths 110_4-110_7 is controlled by the second controller 104 and is operable for enabling a bypass current of a corresponding cell of the second plurality of cells 106_4-106_7. In one embodiment, a bypass path can include a switch and a resistor coupled in series.

In one embodiment, an unbalanced condition occurs when a cell voltage of a cell (called unbalanced cell) is greater than a predetermined threshold. In an alternate embodiment, an unbalanced condition occurs when a cell voltage of a cell A (called unbalanced cell) is greater than that of another cell B, and a voltage difference between the cell voltage of the cell A and a cell voltage of the cell B is greater than a predetermined threshold. When an unbalanced condition occurs in the first plurality of cells 106_1-106_4, the first controller 102 can generate a corresponding control signal (e.g., 108_1, ..., 108_4) to balance the unbalanced cell by enabling a bypass (bleeding) current flowing through a bypass path (e.g., 110_1, ..., 110_4) coupled in parallel with the unbalanced cell. Therefore, after cell balancing, a voltage difference among the first plurality of cells 106_1-106_4 can be less than a predetermined voltage difference $\Delta V_1$. In other words, cell voltages of the first plurality of cells 106_1-106_4 are within a voltage range between $V_1$ and $V_2$ ($[V_1, V_2]$; $V_2=V_1+\Delta V_1$). In one embodiment, voltage levels $V_1$ and $V_2$ can vary in different applications/situations. In one such embodiment, a voltage $V_{com}$ of the common cell 106_4 is also within the range of $[V_1, V_2]$ after cell balancing.

Similarly, when an unbalanced condition occurs in the second plurality of cells 106_4-106_7, the second controller 104 can generate a corresponding control signal (e.g., 108_5, ..., 108_8) to balance the unbalanced cell. Therefore, after cell balancing, a voltage difference among the second plurality of cells 106_4-106_7 can be less than a predetermined voltage difference $\Delta V_2$. In other words, cell voltages of the second plurality of cells 106_4-106_7 are within a voltage range between $V_3$ and $V_4$ ($[V_3, V_4]$; $V_4=V_3+\Delta V_2$). In one embodiment, the voltage levels $V_3$ and $V_4$ can vary in different applications/situations. The voltage $V_{com}$ of the common cell 106_4 is within the range of $[V_3, V_4]$ after cell balancing.

Consequently, in one embodiment, the voltage $V_{com}$ of the common cell 106_4 is within a voltage range of $[V_1, V_2]$ and $[V_3, V_4]$ ($[V_1, V_2] \cap [V_3, V_4]$) after cell balancing. In addition, cell voltages of the first plurality of cells 106_1-106_4 and the second plurality of cells 106_4-106_7 are within a voltage range of $[V_1, V_2]$ or $[V_3, V_4]$ ($[V_1, V_2] \cup [V_3, V_4]$). As such, a cell voltage difference among the first plurality of cells 106_1-106_4 and the second plurality of cells 106_4-106_7 is less than a voltage difference $\Delta V_{12}$ that is equal to $\Delta V_1$ plus $\Delta V_2$.

Advantageously, the common cell 106_4 can be used as a reference cell for the first plurality of cells 106_1-106_4 and the second plurality of cells 106_4-106_7, such that a cell voltage difference between any two cells from cells 106_1-106_7 can be less than a voltage difference $\Delta V_{12}$ after cell balancing. Therefore, after cell balancing, each of the first plurality of cells 106_1-106_4 can be balanced with each of the second plurality of cells 106_4-106_7. Since no extra signal-chip microcomputer is needed, the cost can be reduced. Furthermore, abundance of code programming and complicated process operation can be omitted.

Figure 1B:
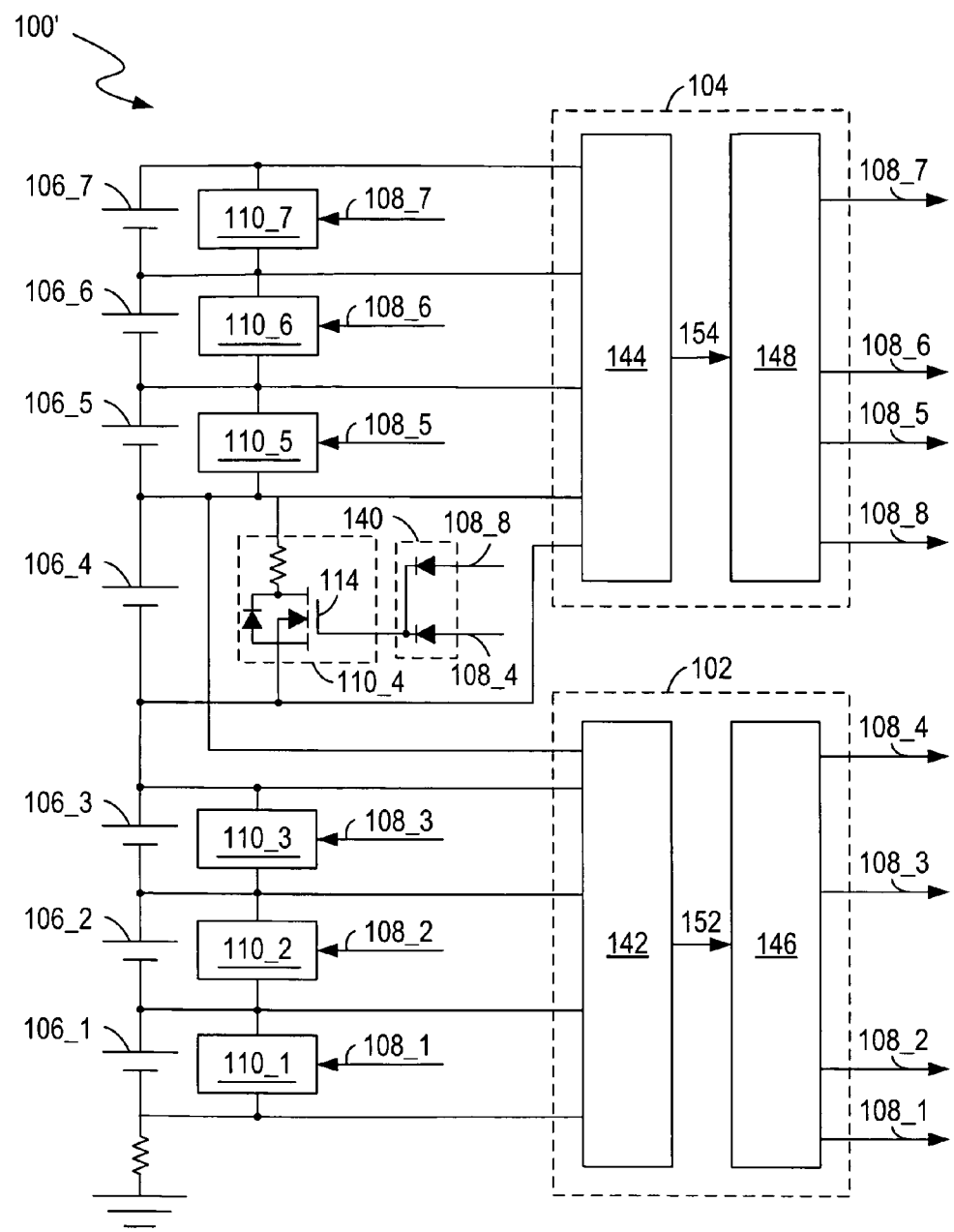
FIG. 1B shows a diagram of a cell balancing system with multiple controllers, in accordance with one embodiment of the present invention.

FIG. 1B shows another block diagram of a cell balancing system 100' with multiple controllers, in accordance with one embodiment of the present invention. Elements that are labeled the same as in FIG. 1A have similar functions and will not be repetitively described herein for purposes of brevity and clarity. As shown in FIG. 1B, the first controller 102 includes a monitor 142 for monitoring the first plurality of cells 106_1-106_4, and a processor 146 coupled to the monitor 142 for receiving a monitoring information 152 from the monitor 142 and for controlling cell balancing of the first plurality of cells 106_1-106_4. In addition, the second controller 104 includes a monitor 144 for monitoring the second plurality of cells 106_4-106_7, and a processor 148 coupled to the monitor 144 for receiving a monitoring information 154 from the monitor 144 and for controlling cell balancing of the second plurality of cells 106_4-106_7.

In one embodiment, the cell balancing system 100' includes a switch 114 which is coupled in parallel with the common cell 106_4 and can be controlled by the first controller 102 and the second controller 104. More specifically, the bypass path 110_4 includes the switch 114 coupled in parallel with the common cell 106_4, and the switch 114 can be coupled to a logic OR gate 140. In the example of FIG. 1B, the logic OR gate 140 includes two diodes coupled at the N-node of the two diodes. As shown in FIG. 1B, the logic OR gate 140 can receive a control signal 108_4 generated by the first controller 102 and/or a control signal 108_8 generated by the second controller 104, and output a control signal for controlling the switch 114.

The monitor 142 can monitor a cell voltage for each cell of the first plurality of cells 106_1-106_4 and output a monitoring information 152 indicative of the cell voltages. The processor 146 can receive the monitoring information 152 and output a control signal (e.g., 108_1, ..., 108_4) to conduct a corresponding bypass path (e.g., 110_1, ..., 110_4) for controlling cell balancing of the first plurality of cells 106_1-106_4. Similarly, the monitor 144 can monitor a cell voltage for each cell of the second plurality of cells 106_4-106_7 and output a monitoring information 154 indicative of the cell voltages. The processor 148 can receive the monitoring information 154 and output a control signal (e.g., 108_5, ..., 108_8) to conduct a corresponding bypass path (e.g., 110_4, ... 110_7) for controlling cell balancing of the second plurality of cells 106_4-106_7.

In one embodiment, when the common cell 106_4 is unbalanced with the plurality of cells 106_1-106_3, the processor 146 can generate a control signal 108_4 to the logic OR gate 140 to conduct the bypass path 110_4, such that the common cell 106_4 can be balanced with the plurality of cells 106_1-106_3. Similarly, when the common 106_4 is unbalanced with the plurality of cells 106_5-106_7, the processor 148 can generate a control signal 108_8 to the logic OR gate 140 to conduct the bypass path 110_4, such that the common cell 106_4 can be balanced with the plurality of cells 106_5-106_7. As such, the common cell 106_4 can be used as a reference cell between the first plurality of cells 106_1-106_4 and the second plurality of cells 106_4-106_7. Advantageously, after cell balancing, each of the first plurality of cells 106_1-106_4 can be balanced with each of the second plurality of cells 106_4-106_7.

As discussed in relation to the example of FIG. 1B, the first controller 102 and the second controller 104 can control the same bypass path 110_4 of the common cell 106_4. In another embodiment, the common cell 106_4 can also be balanced by two bypass paths (not shown in FIG. 1B for purposes of clarity and brevity) coupled in parallel with the common cell 106_4. The two bypass paths can be controlled by the first controller 102 and the second controller 104 respectively. For example, a first bypass path can be conducted by a control signal 108_4 from the first controller 102, and a second bypass path can be conducted by a control signal 108_8 from the second controller 104. As such, after cell balancing, each of the first plurality of cells 106_1-106_4 can also be balanced with each of the second plurality of cells 106_4-106_7.

Figure 2:
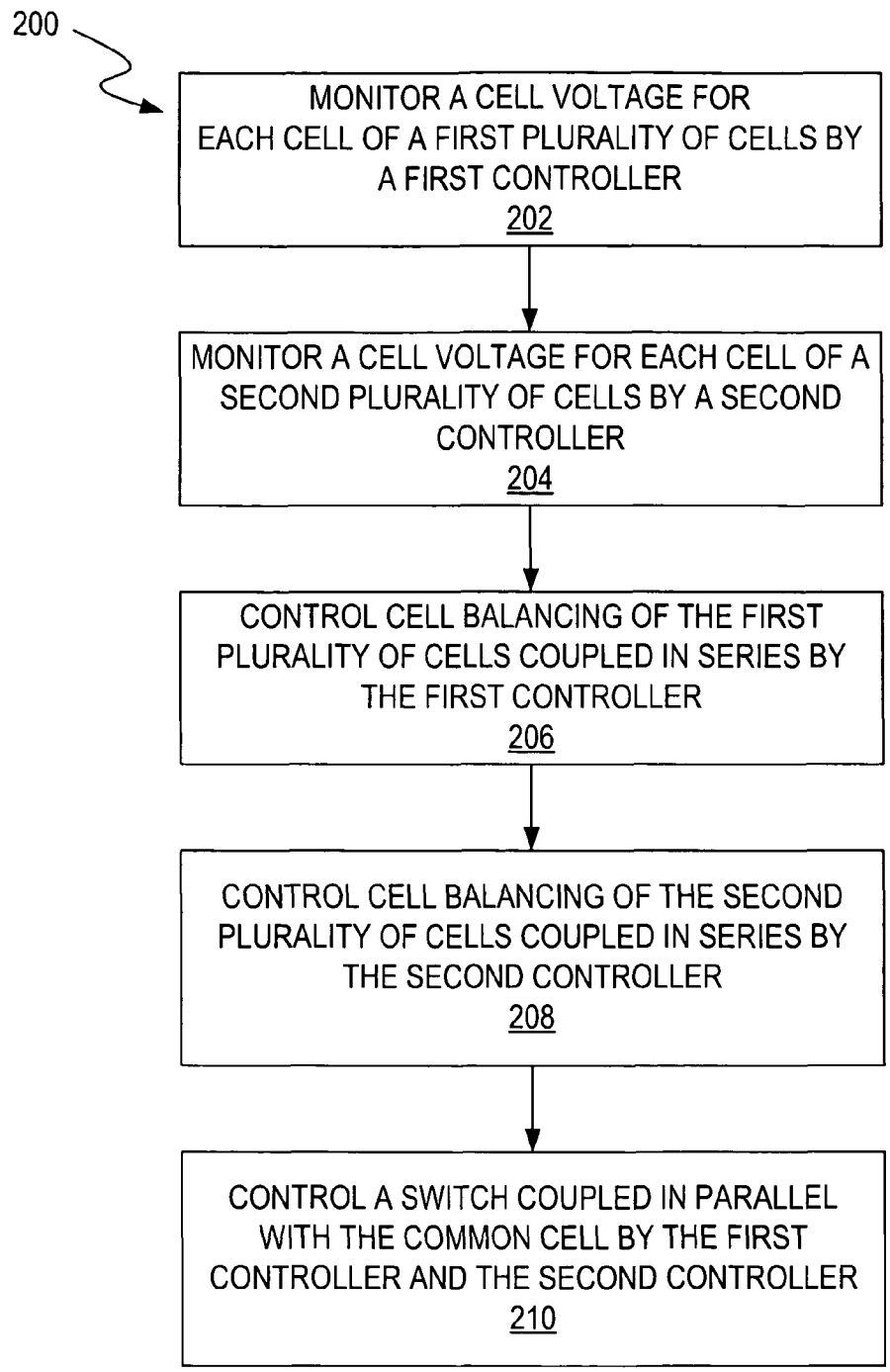
FIG. 2 shows a flowchart of operations performed by a cell balancing system, in accordance with one embodiment of the present invention.

FIG. 2 shows a flowchart 200 of operations performed by a cell balancing system, in accordance with one embodiment of the present invention. FIG. 2 is described in combination with FIG. 1A and FIG. 1B.

As shown in FIG. 2, in block 202, a first controller 102 can monitor a cell voltage for each cell of a first plurality of cells 106_1-106_4. In one embodiment, the first plurality of cells 106_1-106_4 are coupled in series. In block 204, a second controller 104 can monitor a cell voltage for each cell of a second plurality of cells 1064-1067. In one embodiment, the second plurality of cells 106_4-106_7 are coupled in series. There is at least one common cell 106_4 in the first plurality of cells 106_1-106_4 and the second plurality of cells 106_4-106_7. In one embodiment, the first controller 102 and the second controller 104 can operate simultaneously.

In block 206, the first controller 102 can control cell balancing of the first plurality of cells 106_1-106_4 coupled in series. More specifically, when an unbalanced condition occurs in the first plurality of cells 106_1-106_4, the first controller 102 can balance the unbalanced cell by generating a control signal (e.g., 108_1, . . . , 108_4) to conduct a corresponding bypass path of the first plurality of bypass paths 110_1-110_4. In one embodiment, the first controller 102 can control charging of the first plurality of cells 106_1-106_4. The first controller 102 can also control discharging of the first plurality of cells 106_1-106_4.

Similarly, in block 208, the second controller 104 can control cell balancing of the second plurality of cells 106_4-106_7 coupled in series. More specifically, when an unbalanced condition occurs in the second plurality of cells 106_4-106_7, the second controller 104 can balance the unbalanced cell by generating a control signal (e.g., 108_5, . . . , 108_8) to conduct a corresponding bypass path of the second plurality of bypass paths 110_4-110_7. In one embodiment, the second controller 104 can control charging of the second plurality of cells 106_4-106_7. The second controller 104 can also control discharging of the second plurality of cells 106_4-106_7.

Advantageously, the common cell 106_4 can be used as a reference cell for balancing the first plurality of cells 106_1-106_4 and the second plurality of cells 106_4-106_7. More specifically, as shown in block 210, a switch 114 that is coupled in parallel with the common cell 106_4 can be controlled by the first controller 102 and the second controller 104. After cell balancing, the common cell 106_4 is balanced with the plurality of cells 106_1-106_3 and the plurality of cells 106_5-106_7. As such, each of the first plurality of cells 106_1-106_4 can be balanced with each of the second plurality of cells 106_4-106_7.

Accordingly, the present invention provides a cell balancing system which can be used for balancing at least a first plurality of cells and a second plurality of cells. A first controller and a second controller can be implemented to control cell balancing of the first plurality of cells and the second plurality of cells respectively. In addition, there is at least one common cell which can be used as a reference cell between the first plurality of cells and the second plurality of cells. As such, after cell balancing, each of the first plurality of cells can be balanced with each of the second plurality of cells. In one embodiment, multiple cells can be balanced simultaneously, e.g., multiple bypass paths can be conducted simultaneously.

In the examples of FIG. 1A and FIG. 1B, two controllers are employed for balancing cells 106_1-106_7. Similarly, in one embodiment, when the cell balancing system is used for balancing more cells, e.g., a first plurality of cells, a second plurality of cells and a third plurality cells, three or more controllers can be implemented to control cell balancing of the aforementioned pluralities of cells respectively. In one such embodiment, there is at least one common cell in the first plurality of cells and the second plurality of cells, and at least one common cell in the second plurality of cells and the third plurality of cells. The common cell in the first plurality of cells and the second plurality of cells can be the same as or different from the common cell in the second plurality of cells and the third plurality of cells. After cell balancing, the first plurality of cells, the second plurality of cells, and the third plurality of cells can be balanced with each other, in one embodiment.

Figure 3:
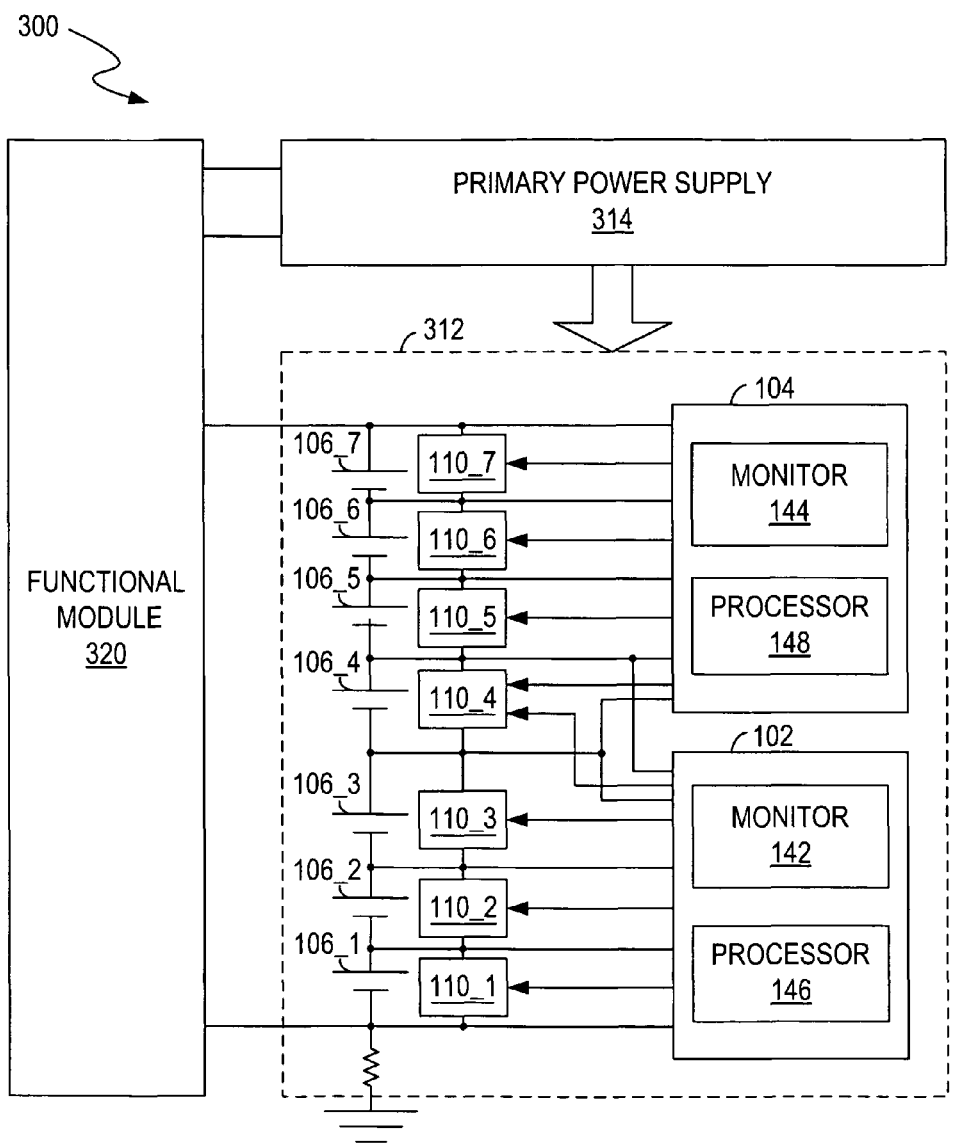
FIG. 3 shows a block diagram of a power driven system, in accordance with one embodiment of the present invention.

FIG. 3 shows a block diagram of a power driven system 300, in accordance with one embodiment of the present invention. Elements that are labeled the same as in FIG. 1A and FIG. 1B have similar functions and will not be repetitively described herein for purposes of brevity and clarity. As shown in FIG. 3, the power driven system 300 includes a functional module 320 for performing a function and an energy unit 312 for powering the functional module 320. The functional module 320 can include, but is not limited to, a computer system and a vehicle motor. The energy unit 312 can be charged by a primary power supply 314 (e.g., an adapter).

In one embodiment, the cell balancing system (e.g., the cell balancing system 100, the cell balancing system 100') can be implemented in the energy unit 312. The energy unit 312 includes a first controller 102 for controlling cell balancing of a first plurality of cells 106_1-106_4 coupled in series, and a second controller 104 for controlling cell balancing of a second plurality of cells 106_4-106_7 coupled in series. There is at least one common cell 106_4 in the first plurality of cells 106_1-106_4 and the second plurality of cells 106_4-106_7.

A monitor 142 can monitor the first plurality of cells 106_1-106_4 and output a monitoring information 152 to a processor 146, such that the processor 146 can generate one or more control signals 108_1-108_4 to balance the first plurality of cells 106_1-106_4. Similarly, a monitor 144 can monitor the second plurality of cells 106_4-106_7 and output a monitoring information 154 to a processor 148, such that the processor 148 can generate one or more control signals 108_5-108_8 to balance the second plurality of cells 106_4-106_7. As a result, after cell balancing, each of the first plurality of cells 106_1-106_4 can be balanced with each of the second plurality of cells 106_4-106_7.

The primary power supply 314 can be used to charge the energy unit 312. More specifically, the plurality of cells 106_1-106_7 can be charged by the primary power supply 314. The charging of the first plurality of cells 106_1-106_4 and the charging of the second plurality of cells 106_4-106_7 can be controlled by the first controller 102 and the second controller 104 respectively.

In operation, when the primary power supply 314 is available, the functional module 320 is powered by the primary power supply 314, and the energy unit 312 can also be charged by the primary power supply 314, in one embodiment. In one embodiment, when the primary power supply 314 is not available, the first controller 102 and the second controller 104 can control the discharging of the plurality of cells 106_1-106_7, such that the functional module 320 can be powered by the energy unit 312.

The cell balancing system (e.g., the cell balancing system 100, the cell balancing system 100') can operate in many phases, e.g., battery charging, battery discharging, battery standby, etc. Advantageously, in one embodiment, the energy unit 312 can be used in a computer system to power the computer system. The energy unit 312 can also be used in a vehicle or an electrical bike to powering a vehicle motor or a bike motor. The energy unit 312 can be used in many other applications, e.g., uninterruptible power supplies, base stations in wireless communications, etc. Advantageously, the energy unit 312 can be used as a backup power supply to power the functional module 320 when the primary power supply 314 (e.g., an adapter) is not available so as to ensure proper functions of the functional module 320.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A cell balancing system comprising:
   a first controller for controlling cell balancing of a first plurality of cells coupled in series;
   a second controller for controlling cell balancing of a second plurality of cells which are coupled in series and have at least one common cell with said first plurality of cells; and
   a balancing circuit coupled to said common cell and controlled by said first and second controllers and operable for balancing said first and second pluralities of cells.

2. The cell balancing system as claimed in claim 1, wherein said first controller is operable for monitoring a cell voltage for each cell of said first plurality of cells.

3. The cell balancing system as claimed in claim 1, wherein said second controller is operable for monitoring a cell voltage for each cell of said second plurality of cells.

4. The cell balancing system as claimed in claim 1, wherein each of said first plurality of cells is balanced with each of said second plurality of cells.

5. The cell balancing system as claimed in claim 1, wherein said balancing circuit comprises a switch coupled in parallel with said common cell and controlled by said first controller and said second controller.

6. The cell balancing system as claimed in claim 1, wherein said first controller is further operable for controlling charging of said first plurality of cells, and wherein said second controller is further operable for controlling charging of said second plurality of cells.

7. The cell balancing system as claimed in claim 1, wherein said first controller is further operable for controlling discharging of said plurality of cells, and wherein said second controller is further operable for controlling discharging of said second plurality of cells.

8. The cell balancing system as claimed in claim 1, wherein said first controller comprises a monitor for monitoring said first plurality of cells, and a processor coupled to said monitor for receiving monitoring information from said monitor and for controlling cell balancing of said first plurality of cells.

9. The cell balancing system as claimed in claim 1, wherein said second controller comprises a monitor for monitoring said second plurality of cells, and a processor coupled to said monitor for receiving monitoring information from said monitor and for controlling cell balancing of said second plurality of cells.

10. The cell balancing system as claimed in claim 1, further comprising:
    a first plurality of bypass paths respectively coupled to said first plurality of cells in parallel, wherein each of said first plurality of bypass paths is controlled by said first controller and is operable for enabling a bypass current of a corresponding cell of said first plurality of cells; and
    a second plurality of bypass paths respectively coupled to said second plurality of cells in parallel, wherein each of said second plurality of bypass paths is controlled by said second controller and is operable for enabling a bypass current of a corresponding cell of said second plurality of cells.

11. A method for cell balancing, comprising:
    controlling cell balancing of a first plurality of cells coupled in series by a first controller;
    controlling cell balancing of a second plurality of cells coupled in series by a second controller, wherein there is at least one common cell in said first plurality of cells and said second plurality of cells;
    controlling a balancing circuit coupled to said common cell by said first and second controllers; and
    balancing said first and second pluralities of cells using said balancing circuit.

12. The method as claimed in claim 11, further comprising:
    monitoring a cell voltage for each cell of said first plurality of cells by said first controller.

13. The method as claimed in claim 11, further comprising:
    monitoring a cell voltage for each cell of said second plurality of cells by said second controller.

14. The method as claimed in claim 11, wherein said controlling said balancing circuit comprises controlling a switch coupled in parallel with said common cell by said first controller and said second controller.

15. The method as claimed in claim 11, further comprising:
    controlling charging of said first plurality of cells by said first controller; and
    controlling charging of said second plurality of cells by said second controller.

16. The method as claimed in claim 11, further comprising:
    controlling discharging of said first plurality of cells by said first controller; and
    controlling discharging of said second plurality of cells by said second controller.

17. An electrical system comprising:
    a functional module for performing a function; and
    an energy unit for powering said functional module, said energy unit comprising:
        a first controller for controlling cell balancing of a first plurality of cells coupled in series;
        a second controller for controlling cell balancing of a second plurality of cells which are coupled in series and have at least one common cell with said first plurality of cells; and
        a balancing circuit coupled to said common cell and controlled by said first and second controllers and operable for balancing said first and second pluralities of cells.

18. The electrical system as claimed in claim 17, wherein said functional module comprises a computer system.

19. The electrical system as claimed in claim 17, wherein said functional module comprises a vehicle motor.

20. The electrical system as claimed in claim 17, wherein said balancing circuit comprises a switch coupled in parallel with said common cell and controlled by said first controller and said second controller.

21. The electrical system as claimed in claim 17, wherein each of said first plurality of cells is balanced with each of said second plurality of cells.

22. The electrical system as claimed in claim 17, wherein said first controller comprises a monitor for monitoring said first plurality of cells, and a processor coupled to said monitor for receiving monitoring information from said monitor and for controlling cell balancing of said first plurality of cells.

23. The electrical system as claimed in claim 17, wherein said second controller comprises a monitor for monitoring said second plurality of cells, and a processor coupled to said monitor for receiving monitoring information from said monitor and for controlling cell balancing of said second plurality of cells.

24. The cell balancing system as claimed in claim 1, wherein said balancing circuit comprises a first bypass path coupled in parallel with said common cell and controlled by said first controller, and comprises a second bypass path coupled in parallel with said common cell and controlled by said second controller.

25. The cell balancing system as claimed in claim 10, wherein said balancing circuit comprises a common bypass path of said first and second pluralities of bypass paths.

* * * * *